United States Patent [19]

Brown et al.

[11] 3,917,067

[45] Nov. 4, 1975

[54] CARRIER FOR CASSETTES

[75] Inventors: Rollen E. Brown; James Girdwood, both of Denver, Colo.

[73] Assignee: Utex, Inc., Englewood, Colo.

[22] Filed: Apr. 1, 1974

[21] Appl. No.: 456,446

[52] U.S. Cl. .......... 206/387
[51] Int. Cl.$^2$ .......... B65D 85/672
[58] Field of Search .......... 206/DIG. 36, 387

[56] References Cited

UNITED STATES PATENTS

| | | | |
|---|---|---|---|
| 3,381,810 | 5/1968 | Lasher et al. | 206/387 |
| 3,620,367 | 11/1971 | Stembel | 206/387 |
| 3,708,061 | 1/1973 | Weingarden et al. | 206/DIG. 36 |

*Primary Examiner*—George E. Lowrance
*Assistant Examiner*—Douglas B. Farrow
*Attorney, Agent, or Firm*—Van Valkenburgh, Lowe & Law

[57] ABSTRACT

Tape cassettes are mounted upon a flat base sheet, a carrier for the cassettes, which has resilient studs outstanding from the base sheet. The studs are arranged in spaced pairs to permit each stud of a pair to fit into a reel hub opening of the cassette and to firmly and resiliently grip the reel flange therein. Thus, the cassette is held in place against the base sheet by a pair of studs and at the same time, the tape reels within it are immobilized.

The base sheet may be part of a folder which is wrapped about a single cassette, or it can be a single sheet such as a looseleaf binder which can hold a number of cassettes. It may also be a portion of any other type of carrier for holding one or more cassettes in place; or even a portion of a wall whereon pairs of studs are mounted for holding cassettes.

11 Claims, 10 Drawing Figures

CARRIER FOR CASSETTES

This invention relates to containers for tape cassettes and more particularly to open type containers to simplify the problems encountered in storing cassettes. The basic feature of the present invention resides in providing a carrier which includes a base sheet whereon cassettes may be mounted, and hence the invention will be called a "carrier for cassettes".

A tape cassette represents a practical mode of storing a reach of magnetic tape suitable for recording or playing back a program. Thus, these tape cassettes have become, to a great extent, standardized to fit into many types of recorders and players and their manufacture has become a large volume business. For example, practically all popular songs are now being recorded on tape stored in cassettes.

The tape cassette is a flat, rectangular box holding a pair of tape reels. A length of tape is wound upon these reels with a reach between the reels extending about one edge of the box, which is sometimes called the bottom edge, where the driving capstans and a recording head of the tape recorder or player can engage the tape to wind and unwind the tape and record information or play back material previously recorded on the tape.

These cassettes are well made since the tapes they hold are often quite valuable. Thus, it is important that they be stored carefully, to avoid damaging them or the tape within them. Accordingly, individual cassettes are conventionally kept in individual boxed while groups of cassettes are kept in vacuum formed trays of various forms, configurations and arrangements so that they can be used in connection with ring binders, or folders or drawers or the like. The use of trays for cassettes has become popular for supplementing educational reading material. A course to teach a selected subject can very well include the text, often material carried in a ring binder and a number of lectures upon tapes in cassettes. The cassette trays are often formed to fit in the ring binder with the text covering the subject matter and many different arrangements and types of trays are required for this purpose.

In keeping with the value of the cassette, cheap cardboard boxes or trays are generally not used and the cassette boxes and trays are well made of good plastic materials. Also, though such individual boxes are ideal for a small collection of cassettes, they are not satisfactory where a large number of cassettes are to be stored. For example, a file to hold a large number of individual cassettes would necessarily be narrow in width and would take up an undue amount of wall space if each cassette were to be easily available. Where trays of cassettes are to be used in conjunction with educational material, it becomes necessary to provide trays for many different numbers and arrangements of cassettes, each of which will require individual dies and molds. This makes the production of the trays an expensive proposition, especially when small quantities of trays are involved. Another disadvantage resides in the fact that plastic materials used in the manufacture of boxes and trays have become more and more expensive and cheaper storage facilities are desirable.

The present invention was conceived and developed with the foregoing and other considerations in view. This invention comprises, in essence, a carrier for cassettes which includes a base sheet for holding one or more cassettes, and this base sheet may be part of a package which embraces a cassette. Also, the base sheet may be used in any other desired manner and arranged in different ways to suit the storage problem at hand. For example, the base sheet may be proportioned to fit a looseleaf binder. The cassettes are affixed to the base sheets by sets of resilient studs outstanding from the face of the sheet to fit into the cassette hubs. These studs, of resilient, plastic material, are carefully sized to properly grip the reel flanges within the cassettes with a pressure sufficient to hold the cassettes in place, but without any danger of damaging the reels in the cassettes.

The carrier for cassettes may be part of a folder which will be wrapped about the cassette whenever it is to be stored, or it may be a simple sheet to be used as a filing card, or fitted into a looseleaf binder or the like. For example, the carrier may be formed as a folder to hold a group of cassettes which may be the same size as a record album envelope and thus, can be easily and conveniently fitted into the storage cabinet of a record player along with a number of record albums. It may even be a wall section or the like, holding a large number of cassettes.

It follows that an object of the present invention is to provide a novel and improved carrier for cassettes which includes a base sheet having studs projecting from its surface to grip and hold one or more cassettes in place upon the sheet.

Another object of the invention is to provide a novel and improved carrier for cassettes which may be formed in various ways such as a folder wherein a cassette is mounted on flat sheet which may be put in a ring binder or envelope or on a wall.

Another object of the invention is to provide a novel and improved cassette carrier which may be manufactured by simple processes without the need for a number of expensive and elaborate dies and with a single set of dies capable of being arranged to form cassette carriers of various configurations which permits the cassettes to be filed, placed in texts, and/or otherwise stored in an efficient manner regardless of the type of storage desired and with substantial reductions in cost and saving of critical materials.

Another object of the invention is to provide a cassette carrier having a novel and improved stud structure for holding a cassette against a base sheet by simply placing the cassette upon a pair of studs outstanding from the base sheet which securely grip the reel flanges of the cassette without the risk of damaging the spline lugs on the reel flanges.

Other objects of the invention are to provide a novel and improved carrier for holding one or a group of cassettes, which is a simple, economical, reliable, rugged and a neat-appearing unit of high quality construction.

With the foregoing and other objects in view, my present invention comprises certain constructions, combinations and arrangements of parts and elements as hereinafter described, defined in the appended claims and illustrated in preferred embodiment in the accompanying drawings in which:

Figures 1, 2, 3, 4, 5, 6:
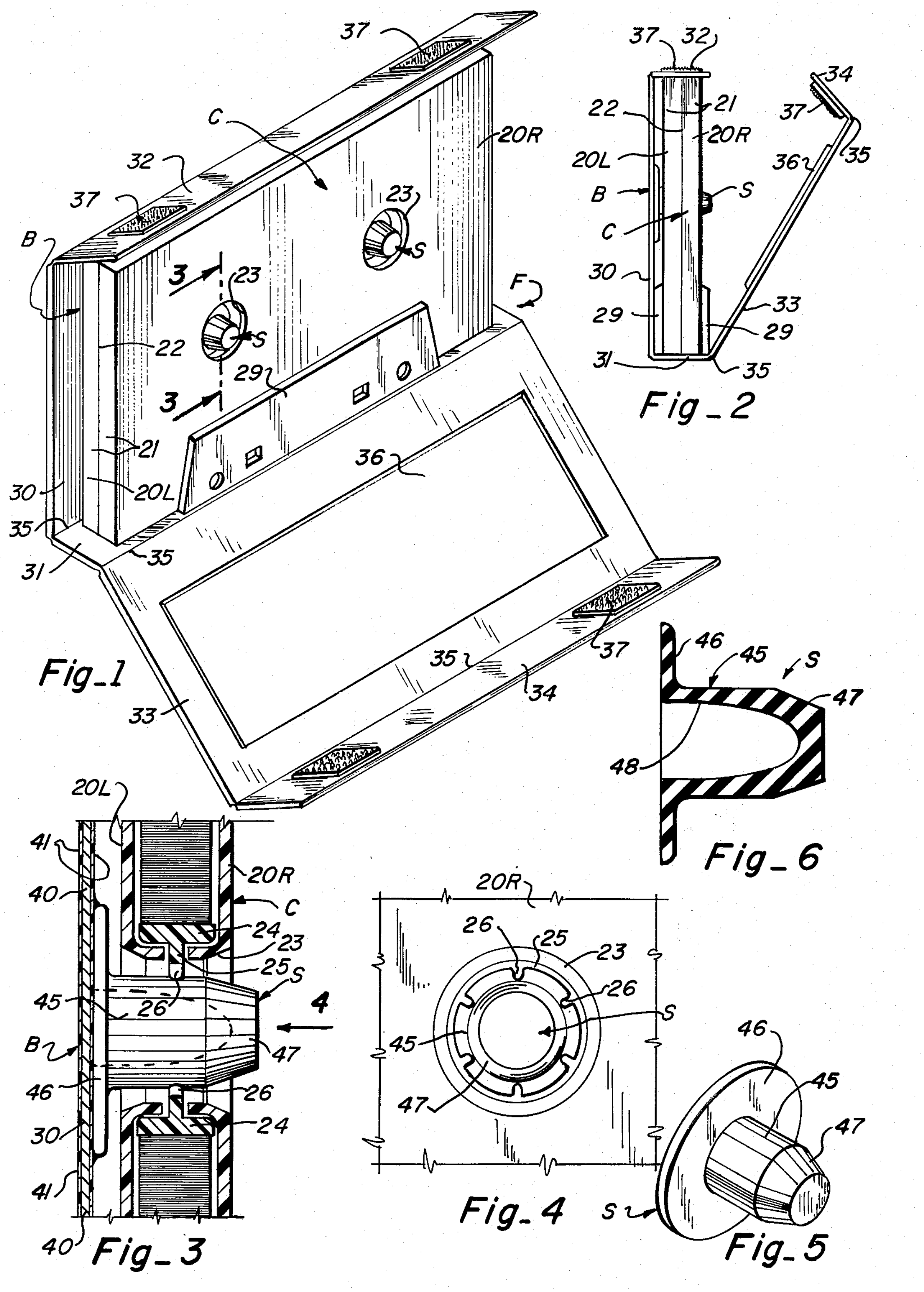
FIG. 1 is an isometric view of a cassette placed in a carrier, a folder, constructed according to the invention which is shown as being open to better illustrate the cassette therein.
FIG. 2 is an edge view of the cassette in the folder shown at FIG. 1, but with the folder being partially closed.
FIG. 3 is a fragmentary enlarged sectionial detail as taken from the indicated line 3-3 at FIG. 1, and showing a base sheet of laminated material to which the stud is welded.
FIG. 4 is a fragmentary detail view as taken from the indicated arrow 4 at FIG. 3.
FIG. 5 is an isometric view of a stud per se which is used to hold a cassette in place as in the manner shown at FIG. 3.
FIG. 6 is a longitudinal sectional view of the stud shown at FIG. 5.

In describing the several embodiments of the invention, set forth in the drawings, it is first desirable to consider the basic structure of a cassette which is illustrated or partially illustrated at FIGS. 1 to 4 and 7. A cassette C is essentially, a rectangular, flat box. It is formed as two plastic side shells 20L and 20R having preformed, half-edge portions 21 which are fitted together at a center seam 22 to complete the box. A pair of reel hubs 23 are also formed in the face of the cassette C and each hub is formed as two opposing, circular rims which turn inwardly from their respective side shells 20L and 20R but are spaced apart at the center of the cassette box as best illustrated at FIG. 3.

Figure 7:
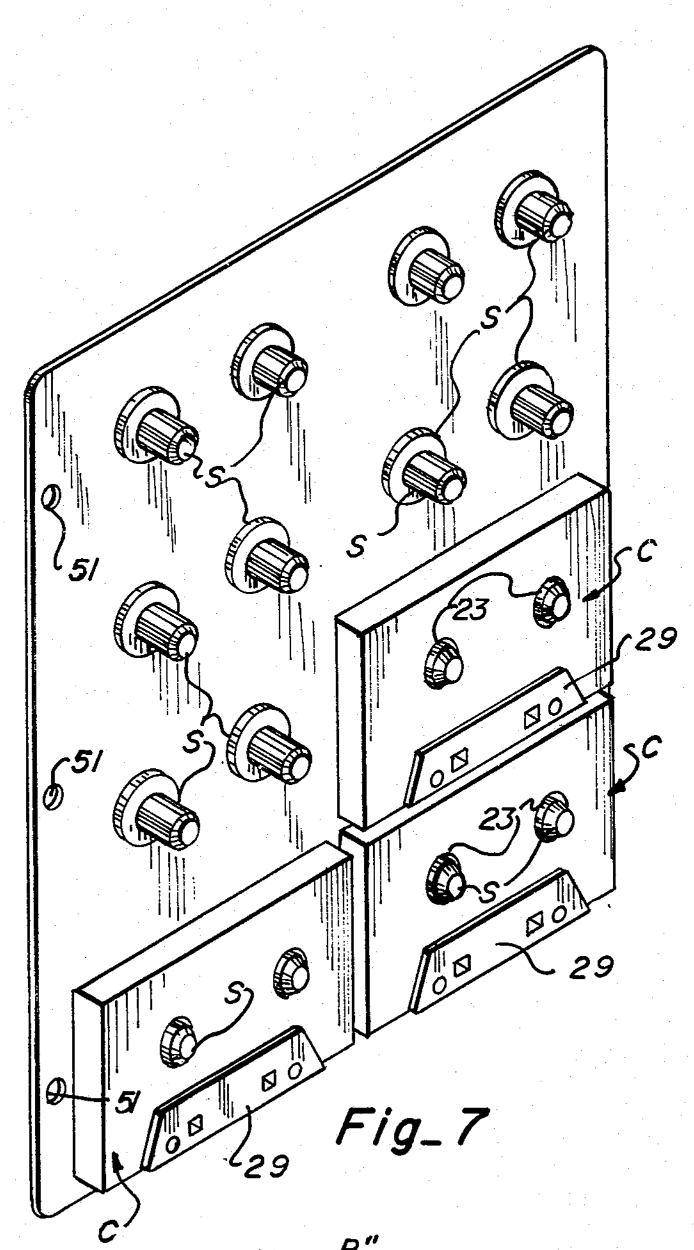
FIG. 7 is an isometric view of a sheet arranged to be fitted into a ring binder and showing studs outstanding therefrom to hold eight cassettes and with three cassettes shown as being held in place by their respective pairs of studs.

Each reel 24 within the container is a simple circular ring loosely fitted upon the hub rims 23. The reel ring 24 includes a central, inwardly projecting flange 25 which lies between the opposing hub rims 23. The inner portion of this flange, which projects into the hub forms an orifice which, is provided with a circular array of inwardly projecting spline lugs 26 which are designed to fit upon a splined shaft in the tape recorder or player. A tape 27 is wound upon the two reel rings 24 within the cassette C, and the reach of the tape between the reel rings extends along the bottom edge of the cassette C to span openings in a widened bottom section 28 extending along the central portion of this bottom edge of the cassette, as illustrated at FIG. 7. The widened bottom section 28 is outwardly off-set a short distance from each side of the shell of the cassette to produce a symmetrical unit as best illustrated at FIG. 2.

FIGS. 1 and 2 show a folder F for carrying a single cassette C and this folder F is a sheet which may be folded at selected fold lines or creases to be wrapped around the cassette. It includes a back wall 30 which forms a base sheet B whereon holding studs S project to hold the cassette C as will be described. A bottom edge strip 31 folds outwardly from the bottom edge of the back wall 30 and a top edge strip 32 folds outwardly from the top edge of the back wall to embrace the bottom and top of the cassette. A front wall 33 folds upwardly from the outer edge of the bottom strip and a top lap strip 34 folds inwardly from the top edge of the front wall. These wall members 30 and 33, and the edge strips 31, 32 and 34 are connected together with suitable creases or hinges 35 between them in the arrangement described. A pocket 36 is formed at the inner face of the front wall above the level of the widened bottom section to contain literature and instructions when desirable. To complete the folder, a connecting device, illustrated as small strips 37 of a contact binder, such as Velcro, may be provided at the top surface of the top edge strip 32 and the undersurface of the top lap strip 34 so that these strips may be secured together when the folder is wrapped about a cassette. Any other similar connective device such as a snap may also be used at these strips 32 and 34 to hold the folder F closed.

This folder F is preferably made of sheet material formed as a laminate having a cardboard core 40 covered with thin surface sheets 41 of vinyl or similar plastic material which envelopes the cardboard core 40. The edges of the plastic surface sheets 41 at the edges of the core 40 are welded together. Also, the hinges 35 may be between core portions with the surface sheets being brought together and welded to hold the individual cardboard cores in place and permit easy folding of the sections. Likewise, the pocket 35 may be a vinyl sheet welded to the inner surface of the front wall 33. This manner of forming a folder as indicated, with cardboard cores enveloped by vinyl sheets, is well known and is used in the manufacture of similar folders for other purposes and hence, need not be described in further detail, excepting to note that the studs S heretofore mentioned, are formed of a resilient plastic material which may be welded directly to the plastic inner surface of the folder.

When the inner surface sheet 41 is of vinyl, the studs can be formed of a polyvinyl chloride which is softened by a plasticizer to provide a resilience having a durometer in the range of 40 – 90 on the Shore-A scale. Another material which may be used is ethylene vinyl acetate and it follows that the studs may be made from any of a number of resilient resins which can be welded or effectively cemented to the sheet material used for the inner surface of the folder. The welding of a stud to the inner surface of a folder may be by heat application or with the use of selected solvents or sealants and such need not be described herein in detail since techniques of welding material such as vinyl resins are well known.

Each stud is formed as a cylindrical body 45 having a disc-shaped base 46 at one end and a short, truncated cone 47 at the other end. The base 46 of each stud is welded to the plastic inner surface 41 of the back wall 30 of the folder F so that the cylindrical body 45 will outstand from this back wall as illustrated at FIG. 3. The truncated cone 47 at the outstanding end of each stud facilitates receiving and aligning a reel hub of a cassette when the cassette is placed upon the folder with the pair of studs extending through the reel hubs. Each stud projects outwardly from the inner side of the back wall a distance which is equal to the width of the offset section 28 of the cassette and accordingly, the cassette will move upon the studs to a point where one side of the offset section 28 will touch the back wall 30. So placed, the side wall of the plastic sheet 20 will lie a short distance outwardly from the back wall as illustrated at FIG. 3. Normally, the cassette will move further upon the stud so that its upper portion will also contact the back wall 30 whenever the cassette is pushed in place. This will cause the cassette to be tipped at a slight angle with respect to the back wall of the folder. However, such will not significantly change the position of the cassette within the folder.

When a cassette is mounted upon the back wall 30 with the studs fitting into each reel hub, they will project through the reel flange 25, and the diameter of the cylindrical body of the stud is such as to grip the spline lugs 26 to hold the cassette in place as best illustrated at FIGS. 3 and 4. Accordingly, the diameter of this cylindrical body 45 is slightly greater than the diametrical spacing between the spline lugs and is such that the cylindrical body of the stud will yield slightly when it is gripped by the spline lugs. It was found that this gripping action need not be very extensive and that the diameter of the cylindrical body 45 could be approximately 1/64 to 1/32-inch greater than the spacing between the spline lugs for effective gripping of the same. The resilient yielding of the cylindrical body is indicated in a somewhat exaggerated manner at 'a' at FIG. 3.

It was found that the walls of the cylindrical body 45 of each stud could be tapered slightly to reduce the diameter at the juncture with the cone 47. Such a taper is permissible providing that the spline lugs 26 of a reel flange will grip the body when the cassette is in place. The taper may be desirable to facilitate the manufacture of the stud. The taper may also be desirable to facilitate the gripping and removal of cassettes to and from the stud, where certain combinations of materials and/or wall thicknesses of the studs are used.

From a manufacturing and handling viewpoint, it was also found that hollow studs were preferable, with an inner wall 48 being substantially cylindrical or slightly tapered as illustrated. However, one limitation did appear. If the walls of these hollow, cylindrical bodies were too thin, the compressive forces which occurred when a cassette was being pushed against the back wall of the folder and upon the studs would cause the studs to buckle. The cassette would then move away from the back wall when it was released. It was found that the wall thickness should be at least approximately ⅛ of the diameter of the stud to avoid buckling of the stud. Although some limitations of resiliency, and of the general proportions of a stud are required, as above indicated, a suitable construction for a stud to hold the cassettes can be easily determined by a few simple tests, and the best proportions for a stud are approximately as illustrated in the drawing.

The folder illustrated at FIGS. 1 and 2 is exemplary of the use of a base surface B having outstanding studs S for holding a cassette. It is obvious that other arrangements are possible. A base surface B is illustrated at FIG. 7 as an insert sheet 50 for a ring binder. This insert sheet 50 is proportioned to a suitable standard size such as 8-½ inches by 11 inches, with conventional binder receiver holes 51 along its edge. As heretofore described, this base sheet may be formed as a cardboard core covered with vinyl surface sheets welded together at the edges of the cardboard core to envelope the core.

It is possible to mount as many as eight standard cassettes upon a sheet 50 sized to be placed in an 8-½ inch by 11 inch ring binder, by placing the cassettes in an upright position as illustrated at FIG. 7 and providing four sets of studs S for receiving the cassettes.

It is immediately obvious that a base sheet B could be used for other purposes where it is desirable to mount a number of cassettes upon a single flat sheet, and individual arrangements can be varied considerably for any given application. This base sheet B could even be a wall section with a substantial number of studs outstanding from it to hold many cassettes.

Figure 8:
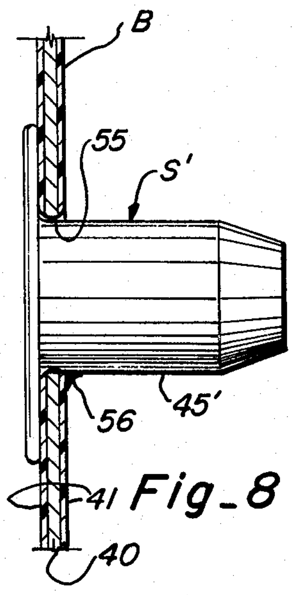
FIG. 8 is a fragmentary sectional view similar to FIG. 3, but with the cassette being removed to show another manner in which a stud may be mounted upon a base sheet of laminated material to which the stud is welded.

In the arrangement illustrated at FIG. 3, a stud was secured to the inner surface sheet 41 of the base sheet B by heat welding or by the use of a suitable adhesive or cement. This may not be entirely satisfactory where a large sheet such as an insert sheet 50 is used, since the vinyl cover sheets of the laminate are often not secured to the cardboard core except at the edges of the core. Thus, when loaded with cassettes, the surface sheet 41 could billow outwardly. This can be avoided by an arrangement such as that illustrated at FIG. 8 where a stud S′ is provided having a cylindrical body 45′ slightly longer than the stud heretofore described and this body is inserted into an orifice 55 through the base sheet B so that the stud base 46 lies against the back side of the sheet, opposite from the side from which the stud projects. Accordingly, the stud is welded or cemented to surface sheet 41 at the back side of the sheet and it is held in place by the orifice 55. Also, if desired, the edges of the vinyl surface sheet 41 at the stud side of the sheet can be welded or cemented to the cylindrical body of the stud as at 56 to securely hold the stud in place and prevent any tendency for the stud to be pushed out of the orifice 55.

Figure 9:
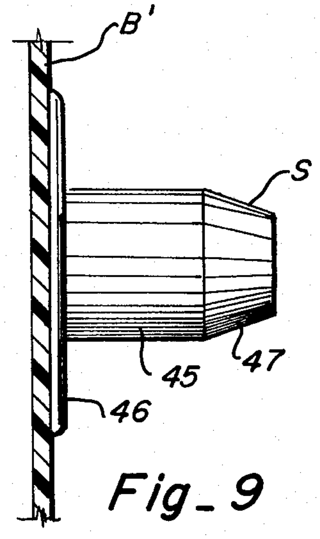
FIG. 9 is a fragmentary sectional view similar to FIG. 8 but showing the stud mounted upon a single thickness base sheet of a plastic material to which the stud is welded.

FIG. 9 illustrates another modified arrangement where the backing sheet B′ is a solid plastic sheet of any suitable plastic material, such as vinyl, to which the bases 46 of the studs S can be affixed by welding or cementing as in the manner illustrated.

Figure 10:
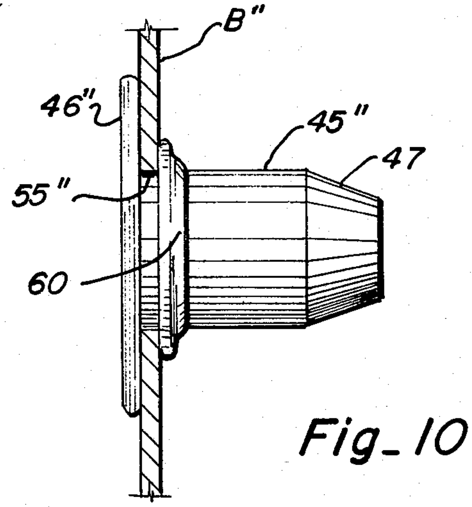
FIG. 10 is a fragmentary sectional view similar to FIG. 8, but illustrating a stud as being mounted on a base sheet with a mechanical lock.

As a further alternative, it is possible to quickly and easily attach a modified stud S″ to a single sheet of material such as a hard cardboard which forms a simple base B″. However, a stud cannot be welded to such a base, and instead it must be mechanically locked in place. In this arrangement, an orifice 55″ is formed in the base sheet B″ in which the cylindrical body of the stud is fitted. The stud S″ is formed with a cylindrical body 45″, a disc-shaped base 46″ and a truncated cone 47. It includes a smaller lock ring 60 on the body 45″ adjacent to the base 46″ and at a spacing therefrom which allows the base sheet to lie between the base 46″ and the lock ring 60, as illustrated at FIG. 10, to hold the stud in place upon the base sheet B″. This lock ring 60 may be integral with the stud S″ as illustrated, or it may be fitted over the stud after the stud is in place upon the base sheet B″. In the arrangement illustrated, where the lock ring is an integral component of the stud, it is contemplated that the stud can be pushed into place and by squeezing and manipulating, the lock ring will be snapped through the orifice, in the same manner as electrical grommets are commonly fitted into holes in the fire wall and other body portions of an automobile. Where the lock ring is not integral with the stud, it may be cemented into place, or the cylindrical body 45 may be provided with a groove, not shown, into which the ring 60 is snapped after the stud is placed in the orifice 55″.

We have now described our invention in considerable detail. However, it is obvious that others skilled in the art can build and devise alternate and equivalent constructions which are nevertheless within the spirit and scope of our invention. Hence, we desire that our protection be limited not by the constructions illustrated and described, but only by the proper scope of the appended claims.

What is claimed is:

1. In combination with a cassette of the type which is shaped as a flat, box-like container having a pair of spaced-apart reel hub openings, each hub being formed by inwardly turned, opposing hub rims and having a reel ring within the cassette at each hub with circular, inwardly projecting flange lying between the hub rims and with the inner edge of the flange forming an orifice within the hub, a cassette carrier to hold the cassette comprising:

a. a flat base sheet where against the cassette is placed; and b. a generally cylindrical, resilient stud outstanding from the base sheet proportioned to extend into a reel hub opening and into and through the reel flange orifice therein to resiliently grip the reel flange therein whenever the cassette is placed against the base sheet, whereby to hold the cassette in place.

2. In the holder defined in claim 1 wherein:

the stud is formed of elastomeric material whose durometer characteristic is in the range of 40 – 90 on the Shore-A scale.

3. In combination with a cassette shaped as a flat, box-like container having a pair of spaced-apart reel hub openings, each hub being formed by inwardly-turned, opposing hub rims and having a reel ring within the cassette at each hub with a circular inwardly-projecting flange lying between the hub rims, with the inner edge of the flange forming an orifice within the hub and an inward array of spline lugs about this orifice to fit upon a splined drive shaft whenever the cassette is used, a cassette carrier to hold the cassette comprising:

a. a flat base sheet whereagainst the cassette is placed when it is to be held; and b. a holding stud outstanding from the base sheet, proportioned to extend into the reel hub opening, and into and through the reel flange orifice therein when the cassette is placed against the base sheet, and with that body portion of the stud then extending through the reel flange orifice being resilient, generally cylindrical in form and having a diameter slightly greater than the diametrical spacing between the spline lugs within the flange orifice whereby the inner edges of the spline lugs grip the cylindrical wall of the stud to hold the cassette in place.

4. In the holder defined in claim 3 wherein:

the stud includes a disc-shaped base adapted to be secured to the base sheet.

5. In the holder defined in claim 3 wherein:

the stud is provided with a tapered end to facilitate guiding the same into a hub and into the reel flange opening therein.

6. In the holder defined in claim 3 wherein:

the stud is hollow with the wall thickness of the same being approximately not less than ⅛ the diameter of the stud to prevent the same from collapsing.

7. In the holder defined in claim 3 wherein:

the base sheet includes a surface of a selected synthetic resin and the stud is made of a synthetic resin of the same general type and is welded to the base sheet.

8. In the holder defined in claim 4 wherein:

the surface of the base sheet is a vinyl type and the stud is formed of a vinyl type resin with the disc-shaped base being welded to the surface.

9. In the holder defined in claim 4 wherein:

the base sheet includes a hole, wherethrough the stud is extended.

10. In the holder defined in claim 9 wherein:

the base sheet includes a plastic surface at the side opposite the projection of the stud, the stud is of a compatible plastic material and includes a disc-shaped base which is welded to the surface of the base sheet opposite the side from which the cylindrical body projects.

11. In the holder defined in claim 9 wherein:

the stud includes a disc-shaped base adapted to be fitted against the surface of the base sheet opposite the side from which the cylindrical body projects, and a collar fitted about the cylindrical body and against the surface of the base sheet from which the cylindrical body projects.

* * * * *